(12) United States Patent
Wass et al.

(10) Patent No.: US 11,769,109 B2
(45) Date of Patent: Sep. 26, 2023

(54) METHOD OF DETERMINING RESOURCE USAGE INFORMATION FOR A FACILITY, DATA COLLECTION DEVICE, DATA COLLECTION SYSTEM AND DATA COLLECTION METHOD

(71) Applicant: Essity Hygiene and Health Aktiebolag, Gothenburg (SE)

(72) Inventors: Andreas Wass, Borlange (SE); Erik Larfars, Borlange (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 421 days.

(21) Appl. No.: 15/102,301

(22) PCT Filed: Dec. 11, 2013

(86) PCT No.: PCT/EP2013/076201
§ 371 (c)(1),
(2) Date: Jun. 7, 2016

(87) PCT Pub. No.: WO2015/086055
PCT Pub. Date: Jun. 18, 2015

(65) Prior Publication Data
US 2016/0364685 A1    Dec. 15, 2016

(51) Int. Cl.
*G06Q 10/08* (2012.01)
*G06Q 10/00* (2012.01)
(Continued)

(52) U.S. Cl.
CPC ....... *G06Q 10/087* (2013.01); *G06Q 10/0631* (2013.01); *G06Q 10/20* (2013.01); *G06Q 10/30* (2013.01); *Y02W 90/00* (2015.05)

(58) Field of Classification Search
CPC .. G06Q 10/087; G06Q 10/0631; G06Q 10/20; G06Q 10/30; Y02W 90/20
See application file for complete search history.

(56) References Cited

U.S. PATENT DOCUMENTS 7,242,307 B1 * 7/2007 LeBlond ............... G08B 21/245
340/573.1
7,774,096 B2 * 8/2010 Goerg ................ A47K 10/3845
700/236
(Continued)

FOREIGN PATENT DOCUMENTS

CN    101828885 A    9/2010
CN    103118576 A    5/2013
(Continued)

OTHER PUBLICATIONS

Australian Office Action dated Jan. 17, 2017 issued in corresponding Australian patent application No. 2013407432 (4 pages).
(Continued)

*Primary Examiner* — Michael Jared Walker
(74) *Attorney, Agent, or Firm* — Cantor Colburn LLP (57) ABSTRACT

The disclosure relates to a method of determining resource usage information for a facility such as an office, conference suite or bathroom; a data collection device for determining resource usage information for the facility; a data collection system; and a method for determining resource usage information for the facility. In the disclosure, resource usage data relating to a location in the facility is received via a first communications channel. A criterion associated with a predetermined usage event is applied to the resource usage data to identify usage data associated with a predetermined usage event. On the basis of the identification, data indicating the occurrence of the predetermined usage event is transmitted via a second communications channel. Thereby, the amount of data needed to be transmitted via the second communications channel may be reduced.

12 Claims, 6 Drawing Sheets

(51) Int. Cl.
*G06Q 10/06* (2012.01)
*G06Q 10/087* (2023.01)
*G06Q 10/20* (2023.01)
*G06Q 10/0631* (2023.01)
*G06Q 10/30* (2023.01)

(56) References Cited

U.S. PATENT DOCUMENTS

| | | | | |
|---|---|---|---|---|
| 7,971,368 B2* | 7/2011 | Fukaya | ............... | A47K 10/48 34/77 |
| 8,066,217 B2* | 11/2011 | Cittadino | ........... | A47K 10/3612 242/563 |
| 8,165,716 B1* | 4/2012 | Goeking | ............... | A47K 10/34 700/237 |
| 8,538,580 B2* | 9/2013 | Brownlee | .......... | A47K 10/3612 700/232 |
| 9,892,372 B2* | 2/2018 | Himmelmann | .............................. | G06Q 10/063118 |
| 2004/0067164 A1* | 4/2004 | VanBrunt | ............... | G01F 23/26 422/63 |
| 2005/0145745 A1* | 7/2005 | Lewis | ..................... | A47K 5/06 242/563 |
| 2005/0171634 A1* | 8/2005 | York | ........................ | A47K 5/06 700/231 |
| 2006/0173576 A1* | 8/2006 | Goerg | ............... | A47K 10/3662 700/236 |
| 2008/0053532 A1* | 3/2008 | Miller | ..................... | E03F 1/006 137/386 |
| 2009/0119142 A1* | 5/2009 | Yenni | ..................... | H04L 67/12 705/7.15 |
| 2009/0151447 A1* | 6/2009 | Jin | ..................... | G01F 23/2928 73/293 |
| 2010/0205727 A1* | 8/2010 | Muhlhausen | ........... | E03D 9/032 4/223 |
| 2010/0268381 A1* | 10/2010 | Goerg | ............... | A47K 10/3662 700/244 |
| 2011/0163870 A1* | 7/2011 | Snodgrass | ............ | A61B 5/1122 340/539.11 |
| 2011/0251469 A1* | 10/2011 | Varadan | ................. | A61B 5/113 600/301 |
| 2012/0056746 A1* | 3/2012 | Kaigler | ................ | A61B 5/0022 340/573.1 |
| 2012/0154169 A1* | 6/2012 | Hoekstra | ................ | G07F 17/18 340/870.01 |
| 2012/0218106 A1* | 8/2012 | Zaima | ....................... | A61L 2/26 340/540 |
| 2013/0098941 A1* | 4/2013 | Wegelin | ................ | B05B 12/004 222/23 |
| 2013/0240554 A1* | 9/2013 | Strahlin | ................. | A47K 10/32 221/1 |
| 2013/0310955 A1* | 11/2013 | Minvielle | .......... | G06Q 30/0281 700/28 |

FOREIGN PATENT DOCUMENTS

| | | |
|---|---|---|
| RU | 2007 137 820 A | 5/2009 |
| RU | 2011 109 162 A | 9/2012 |
| WO | WO-2006/065515 A2 | 6/2006 |
| WO | WO 2006/107933 A1 | 10/2006 |
| WO | WO 2010/019693 A1 | 2/2010 |
| WO | WO-2012/034590 A1 | 3/2012 |
| WO | WO 2012/125960 A2 | 9/2012 |

OTHER PUBLICATIONS

Office Action dated Jan. 22, 2018 issued in corresponding European patent application No. 13 802 977.2 (5 pages).
Australian Examination report No. 2 dated May 29, 2017 issued in corresponding Australian patent application No. 2013407432 (4 pages).
Russian Office Action dated Apr. 28, 2017 issued in corresponding Russian patent application No. 2016127604 (6 pages) and its English-language translation thereof (5 pages).
First Chinese Office Action dated Mar. 1, 2019 issued in Chinese patent application No. 201380082027.3 (6 pages) and its English-language translation thereof (7 pages).
Second Chinese Office Action dated Aug. 28, 2019 issued in Chinese patent application No. 201380082027.3 (4 pages) and its English-language translation thereof (6 pages).
Third Chinese Office Action dated Dec. 24, 2019 issued in Chinese patent application No. 201380082027.3 (4 pages) and its English-language translation thereof (5 pages).
European Office Action issued in European patent application No. 13 802 977.2, dated Aug. 21, 2020.
Adnan, N. A. et al., "On expected detection delays for alarm systems with deadbands and delay-timers", Journal of Process Control, Oxford, GB, vol. 21, No. 9, Jun. 28, 2011, pp. 1318-1331, XP028285868.
Nakamura, E. F., et al., "Information Fusion for Wireless Sensor Networks: Methods, Models, and Classifications", ACM Computing Surveys, vol. 39, No. 3, Article 9, Publication date: Aug. 2007, pp. 1-55, XP058312246.
Chinese Patent Office, Office Action issued in CN 201380082027.3 dated Dec. 30, 2021.
European Patent Office, Office Action issued in EP 13802977.2 dated Dec. 1, 2021.

* cited by examiner

METHOD OF DETERMINING RESOURCE USAGE INFORMATION FOR A FACILITY, DATA COLLECTION DEVICE, DATA COLLECTION SYSTEM AND DATA COLLECTION METHOD

CROSS-REFERENCE TO PRIOR APPLICATION

This application is a §371 National Stage Application of PCT International Application No. PCT/EP2013/076201 filed Dec. 11, 2013, which is incorporated herein in its entirety.

TECHNICAL FIELD

The present disclosure relates to a method of determining resource usage information for a facility such as an office, conference suite or bathroom. The disclosure also relates to a data collection device for determining resource usage information for the facility, and to a data collection system and method for determining resource usage information for the facility.

BACKGROUND

Within large organisations, communal facilities are often provided for the use of e.g. employees, visitors, and other personnel. In the context of a commercial establishment, such facilities may include washrooms, conference rooms, document preparation stations, food preparation stations, maintenance stations, local supply storage, and other similar facilities. Each facility may be associated with storage locations or dispensing locations where consumable items to be used in and around the facility may be stored ready for use, and where discarded consumables may be deposited for disposal. In the case of washrooms, such storage locations may include bathroom tissue dispensers, handwash or anti-bacterial gel dispensers, refuse bins, and hygiene product dispensers. Where the facility is a document preparation centre, a storage location may include paper storage locations, cartridge storage locations, stationery item storage locations, and the like. Where the facility is a maintenance area, storage locations may include storage locations for different parts, and for maintenance and cleaning compounds, as well as, for example, handwash dispensers and paper towel dispensers. Such locations generally provide a resource to users of the facility. Especially, the resource may be a consumable, or may be space for depositing used consumables and/or refuse. In each case, the resource may be depleted by users of the facility.

The management of such facilities is generally not provided by the local users of the facilities but is often delegated to a facilities management group within the organisation or outsourced to a facilities management contractor. Such a facilities management group or contractor is then responsible for ensuring that the supplies in each of the storage locations in each of the facilities are maintained at a correct level, i.e., in the case of dispensers or consumable stores, the supplies are maintained at a level which ensures that they do not run out in the course of normal usage, and in the case of waste receptacles, that they are sufficiently regularly emptied before they become full. Allowing a consumable to run out or allowing a waste receptacle to become full causes great inconvenience to the users of facilities, and, especially in settings such as health care establishments, can even lead to serious hygiene issues.

It has therefore become customary for such facilities management groups or contractors to deploy teams of workers who are tasked to perform regular checks on the facilities, to re-supply consumables that are depleted and to empty waste that has accumulated. However, the need to conduct repeated checks on facilities to guard against even the possibility of a resource running low or a waste store becoming full to capacity is very time- and effort-intensive. Therefore, such activities represent a relatively high operating cost and burden for the facilities management group or contractor.

To avoid the need for repeated transport of supplies from a central store and the removal of waste to a central waste collection point from each facility under management, it is conventional in some circumstances for each worker or team of workers to be equipped with a cart carrying all or most of the supplies which are likely to be needed during the course of each team's or worker's assigned route, and to provide sufficient storage space to accommodate all the waste which is expected to be collected during that route. However, the carts themselves must also be managed to ensure that they are provided with the correct type and quantity of each resource that is to be replenished and that they have sufficient capacity for the waste which is to be removed.

The management of facilities, workers or teams, and carts presents a significant organisational and logistical challenge, and relies heavily on the experience of both managers and workers. Such challenges include ensuring that each facility is visited sufficiently regularly to assess the resourcing requirements of each location in the facility, and to replenish and/or empty the locations as appropriate. Further challenges include ensuring that facilities are maintained in adequate condition without needing to provide very large areas for the storage of waste or to maintain a large stock of consumables in the facilities themselves, on the supply carts, or at a central location. Finally a significant challenge is to manage the facilities in such a way so as to respond to unusual events which result in the sudden depletion of one or more resources or a sudden accumulation of waste.

There is therefore a need for a facility management system which is more responsive to unusual events, which enables a reduced use of staff time, and which permits reduced stock levels to be maintained.

SUMMARY

According to a first aspect, there is provided a method of determining resource usage information for a facility. The method includes receiving resource usage data relating to a location in the facility via a first communications channel. The method also includes applying a criterion associated with a predetermined usage event to the resource usage data to identify usage data associated with a predetermined usage event. The method further includes, on the basis of the identification, transmitting data indicating the occurrence of the predetermined usage event via a second communications channel.

In one implementation, the criterion is selected to reduce the quantity of data transmitted relative to the absence of a criterion.

In one implementation, the data indicating the occurrence of the predetermined resource usage event includes the resource usage data identified as being associated with the predetermined resource usage event.

In one implementation, the data indicating the occurrence of the predetermined resource usage event includes one or more logical values associated with the predetermined resource usage event.

In one implementation, applying the criterion includes applying a threshold associated with the predetermined resource usage event to the resource usage data.

In one implementation, the predetermined resource usage event is associated with a change in a resource state of the location in the facility. In the implementation, applying the criterion includes determining the previously existing resource state of the location in the facility.

In one implementation, determining the previously existing resource state of the location in the facility includes reading stored data relating to the resource state of the location in the facility, said stored data including a data value or a logical flag.

In one implementation, applying the criterion includes applying the criterion to each of a predetermined quantity of resource usage data. In the implementation, applying the criterion also includes determining the proportion of the resource usage data that satisfy the criterion. In the implementation, applying the criterion further includes identifying usage data as associated with the predetermined event on the basis of the determined proportion. The determined proportion may be 100%.

In one implementation, the predetermined quantity of resource usage data corresponds to a predetermined number of sequentially-received resource usage data values.

In one implementation, prior to applying the criterion, the resource usage data is transformed by applying a filtering algorithm.

In one implementation, transforming the usage data with a filtering algorithm includes determining a statistical parameter associated with a predetermined quantity of the usage data, the statistical parameter can be selected from an arithmetic mean, a geometric mean, or a mode of the predetermined quantity of the usage data.

In one implementation, transforming the resource usage data with a filtering algorithm includes applying a low-pass filter to the resource usage data.

In one implementation, applying the filtering algorithm to the resource usage data includes dividing the resource usage data into sequential blocks and calculating a filtered value for each block.

In one implementation, applying the filtering algorithm to the resource usage data includes calculating a filtered value corresponding to each data value of the resource usage data based on that data value and data values lying within a predetermined window preceding that data value.

In one implementation, transforming the resource usage data with a filtering algorithm includes applying a delta filter to the resource usage data.

In one implementation, the resource usage data is received at predetermined intervals.

In one implementation, the resource usage data includes a time-ordered sequence of values.

In one implementation, the location is a dispenser. In the implementation, the resource usage data is fill level data associated with the dispenser. Also in the implementation, the usage event is selected from a low fill level event and a refill event.

According to a second aspect, there is provided a data collection device for determining resource usage information for a facility, the data collection device having: a processor; a first communication channel controller accessing a first communication channel and operable by the processor; and a second communication channel controller accessing a second communication channel and operable by the processor, the processor being configured to operate the data collection device in accordance with embodiments of the inventive method.

According to a third aspect, there is provided a data collection device for determining resource usage information for a facility. According to the second aspect, the device is operable to receive resource usage data relating to a location in the facility via a first communications channel. The device is also operable to apply a criterion associated with a predetermined resource usage event to the resource usage data to identify resource usage data associated with a predetermined resource usage event. The device is further operable to, on the basis of the identification, transmit data indicating the occurrence of the predetermined resource usage event via a second communications channel.

According to a fourth aspect, there is provided a data collection device for determining resource usage information for a facility, the device including: a receiver operable to receive resource usage data relating to a location in the facility via a first communications channel; an event identification unit operable to apply a criterion associated with a predetermined usage event to the resource usage data to identify usage data associated with a predetermined usage event; and a transmitter operable to transmit on the basis of the identification data indicating the occurrence of the predetermined usage event via a second communications channel.

In one embodiment, the criterion is selected to reduce the quantity of data transmitted relative to the absence of a criterion.

In one embodiment, the data indicating the occurrence of the predetermined resource usage event includes the resource usage data identified as being associated with the predetermined resource usage event.

In one embodiment, the data indicating the occurrence of the predetermined resource usage event includes one or more logical values associated with the predetermined resource usage event.

In one embodiment, the event identification unit further includes a thresholding unit operable to apply a threshold associated with the predetermined resource usage event to the resource usage data and wherein applying the criterion includes applying the threshold using the thresholding unit to the resource usage data.

In one embodiment, the predetermined resource usage event is associated with a change in a resource state of the location in the facility; and the event identification unit is operable in applying the criterion to determine the previously existing resource state of the location in the facility.

In one embodiment, the device further includes a resource state data store and wherein the event identification unit is operable in determining the previously existing resource state of the location in the facility to read stored data from the resource state data store relating to the resource state of the location in the facility, said stored data including a data value or a logical flag.

In one embodiment, the event identification unit is operable, in applying the criterion, to: apply the criterion to each of a predetermined quantity of resource usage data; determine the proportion of the quantity of resource usage data that satisfy the criterion; and identify usage data as associated with the predetermined event on the basis of the determined proportion.

In one embodiment, the determined proportion is 100%.

In one embodiment, the predetermined quantity of resource usage data corresponds to a predetermined number of sequentially-received resource usage data values.

In one embodiment, the event identification unit further includes a filtering unit operable to, prior to applying the criterion, transform the resource usage data by applying a filtering algorithm to the resource usage data.

In one embodiment, the filtering unit is operable to, in transforming the usage data with a filtering algorithm, determine a statistical parameter associated with a predetermined quantity of the usage data.

In one embodiment, the statistical parameter is an arithmetic mean.

In one embodiment, the statistical parameter is a geometric mean.

In one embodiment, the statistical parameter is a median or a mode of the predetermined quantity of the usage data.

In one embodiment, the filtering unit is operable to, in transforming the usage data with a filtering algorithm, apply a low-pass filter to the resource usage data.

In one embodiment, the filtering unit is operable to, in applying the filtering algorithm to the resource usage data, divide the resource usage data into sequential blocks and to calculate a filtered value for each block.

In one embodiment, the filtering unit is operable to, in applying the filtering algorithm to the resource usage data, calculate a filtered value corresponding to each data value of the resource usage data based on that data value and data values lying within a predetermined window preceding that data value.

In one embodiment, the filtering unit is operable to, in applying the filtering algorithm to the resource usage data, apply a delta filter to the resource usage data.

In one embodiment, the receiver is operable to receive the resource usage data at predetermined intervals.

In one embodiment, said intervals are associated with a predetermined quantity of data.

In one embodiment, said intervals are associated with a predetermined quantity of time.

In one embodiment, the resource usage data includes a time-ordered sequence of values.

In one embodiment, the location is a dispenser; the resource usage data is fill level data associated with the dispenser; and the usage event is selected from a low fill level event and a refill event.

In one embodiment, the data collection device further includes an internal power source.

In one embodiment, the first communications channel is a short-range wireless communications channel and the second communications channel is a longer-range wireless communications channel.

In one embodiment, the first communications channel is an IEEE802.15.4, Zigbee, RF4CE, SP100, IEEE802.11 or Bluetooth link.

In one embodiment, the second communications channel is a 3G or 4G cellular link.

According to a fifth aspect, there is provided a data collection system for determining resource usage information for a facility. According to the fifth aspect, the system includes a sensor associated with a location in the facility and arranged to sense and transmit resource usage data over a first communication channel. Also according to the fifth aspect, the system includes a server arranged to receive and process data indicating the occurrence of a predetermined resource usage event via a second communications channel. Further according to the fifth aspect, the system includes a data collection device. In the fifth aspect, the data collection device is operable to receive resource usage data from the sensor via the first communications channel. In the fifth aspect, the data collection device is operable to apply a criterion associated with a predetermined usage event to the resource usage data to identify resource usage data associated with a predetermined resource usage event. In the fifth aspect, the data collection device is operable, on the basis of the identification, transmit data indicating the occurrence of the predetermined resource usage event to the server via the second communications channel.

In one embodiment, the data collection device is a data collection device in accordance with the second, third or fourth aspects.

In one embodiment, the sensor is provided in a bathroom tissue dispenser, the resource usage data corresponds to a bathroom tissue resource level, and the predetermined resource usage event is selected from a dispenser empty and a dispenser full event.

In one embodiment, the sensor is provided in paper towel dispenser and the resource usage data corresponds to a paper towel resource level, and the predetermined resource usage event is selected from a dispenser empty and a dispenser full event.

In one embodiment, the sensor is provided in a handwash dispenser and the resource usage data corresponds to a handwash resource level, and the predetermined resource usage event is selected from a dispenser empty and a dispenser full event.

In one embodiment, the sensor is associated with a waste bin and the resource usage data corresponds to a waste bin capacity resource level, and the predetermined resource usage event is selected from a bin empty and a bin full event.

In one embodiment, the server includes a data store associated with the location and is adapted to determine the nature of the usage event and the consequent state of the location on the basis of the data transmitted from the data collection device and to update the data store to reflect the determined state of the location.

In one embodiment, the sensor is configured to transmit resource usage data at a predetermined interval.

In one embodiment, the predetermined interval is in a range between 2 seconds and 16 minutes.

According to a sixth aspect, there is provided a method for monitoring resource usage information for a facility, the method including: transmitting from a sensor associated with a location in the facility resource usage data relating to that location in the facility; determining resource usage information for the facility using the method of the first aspect of the invention or a data collection device in accordance with the second, third or fourth aspects; receiving data indicating the occurrence of the predetermined usage event at a server via the second communications channel; determining from the received data the nature of the usage event and the consequent state of the location on the basis of the data; and updating a data store associated with the location to reflect the determined state of the location.

In one implementation, the method further includes notifying a user of the determined state of the location.

In one implementation, the method further includes predicting on the basis of the determined state of the location as to when a next maintenance visit to facility should be performed.

BRIEF DESCRIPTION OF THE DRAWINGS

For a better understanding of the present invention, and to show how the same may be carried into effect, reference will be made, by way of example only, to the accompanying Drawings, in which.

DETAILED DESCRIPTION OF PARTICULAR EMBODIMENTS

The following disclosure describes one implementation together with several variants. However, such implementations are considered to be exemplary, and no limitation to the particular structures, functions, or configurations herein described is intended.

Figure 1:
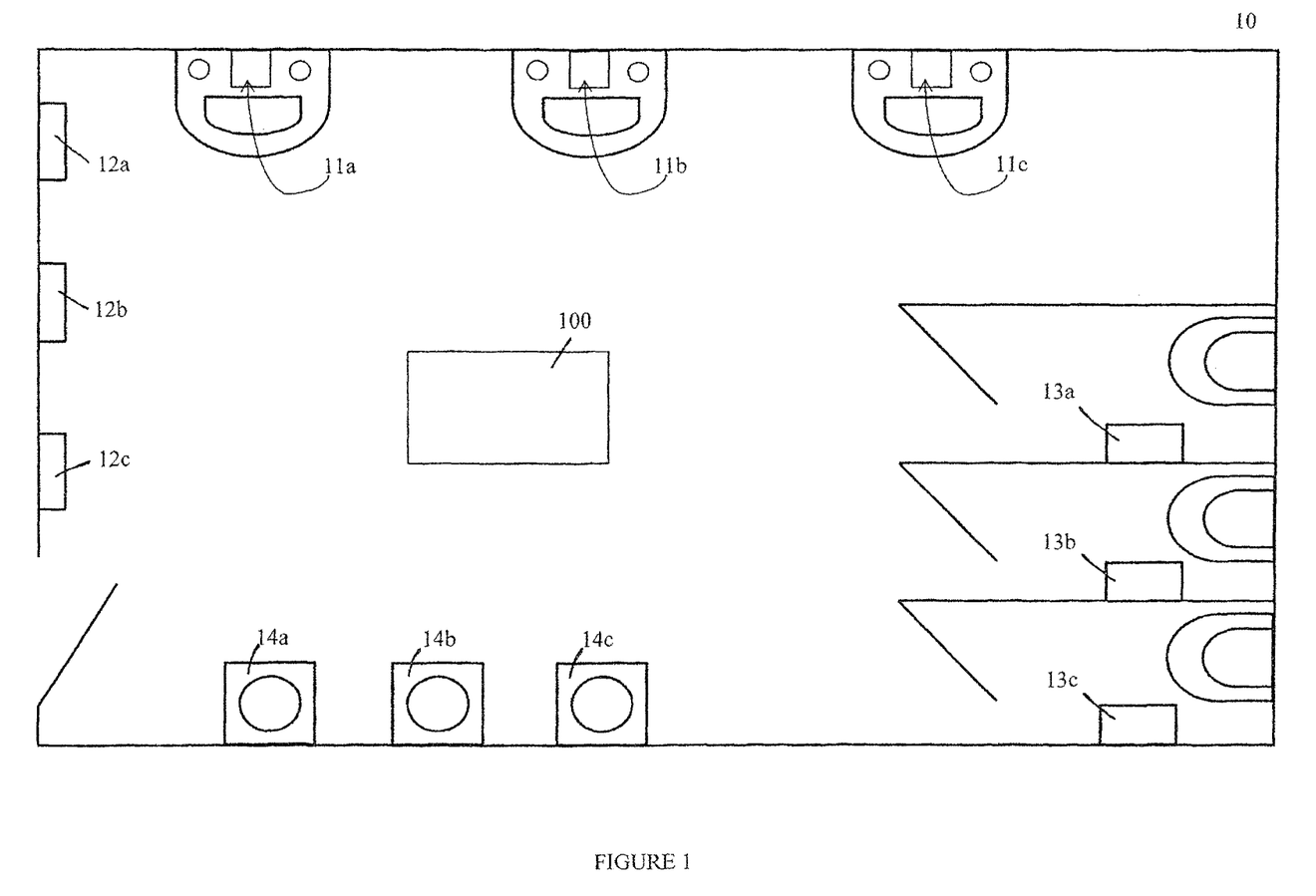
FIG. 1 shows a plan view of a washroom as an example of a facility according to the present disclosure.

FIG. 1 shows, as an example of a managed facility, a washroom 10. Washroom 10 has several locations from which consumables may be dispensed, including handwash dispensers 11a, 11b, 11c; hand towel dispensers 12a, 12b, 12c; bathroom tissue dispensers 13a, 13b, 13c. Washroom 10 also includes waste bins 14a, 14b, 14c for discarding used consumables. During usage of the washroom, handwash dispensers 11a, 11b, 11c, hand towel dispensers 12a, 12b, 12c, and bathroom tissue dispensers 13a, 13b, 13c, may become depleted, while waste bins 14a, 14b, 14c may become filled.

In conventional facilities management approaches, a maintenance worker or team would periodically check washroom 10, including checking the levels in the dispensers 11a, 11b, 11c, the quantity of hand towels in hand towel dispensers 12a, 12b, 12c, the quantity of bathroom tissue in bathroom tissue dispensers 13a, 13b, 13c, and the levels of waste in each of waste bins 14a, 14b, 14c. The maintenance worker may make a judgement as to whether any of the resources are likely to need replenishment in the period before his next scheduled maintenance visit, and he may replenish those resources which are deemed to require such replenishment, provided that the worker has sufficient consumables on the maintenance cart. The maintenance worker may also empty bins 14a, 14b, 14c, provided that the worker has sufficient remaining capacity for waste on the maintenance cart. If either the capacity for waste or the remaining resources on the cart are insufficient, the worker may either not replenish the resources or may adjust his route to visit a central storage location to resupply the cart before continuing.

However, in the present embodiment, the washroom 10 of FIG. 1 also includes data collection device 100, which is configured to receive data relating to resource usage from each storage location in washroom 10 and to provide data on resource usage in the washroom to a central server. Data collection device 100 thus forms part of a data collection system as shown in FIG. 2.

Figure 2:
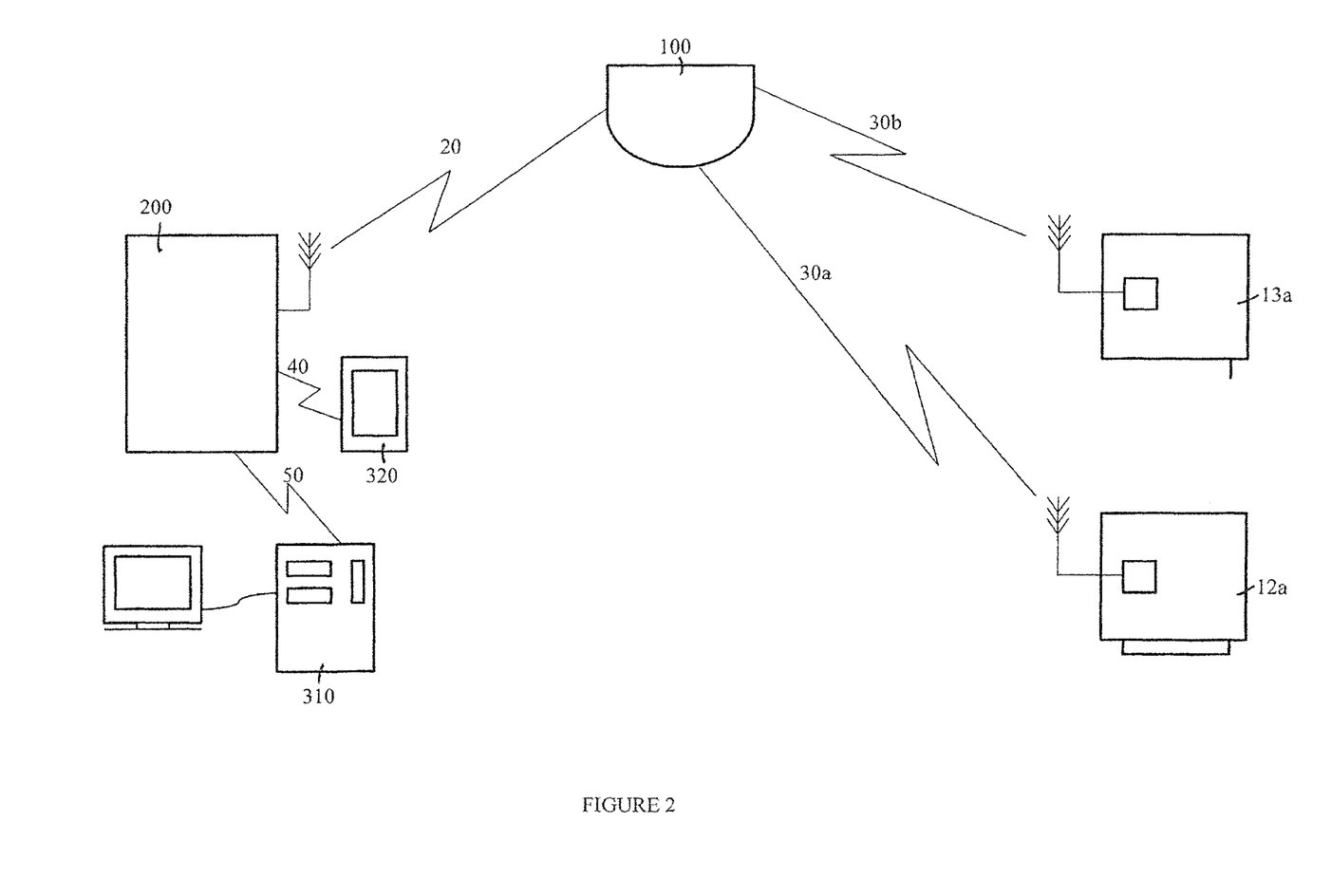
FIG. 2 shows an example of a data collection system applicable to the washroom of FIG. 1.

In FIG. 2, it can be seen that, for example, bathroom tissue dispenser 13a and hand towel dispenser 12a are equipped with sensors which communicate via respective communication channels 30a and 30b with data collection device 100. Over these communication channels, hand towel dispenser 12a and bathroom tissue dispenser 13a are able to provide usage data relating to the usage of the respective resource, namely hand towels or bathroom tissue, from dispensers 12a and 13a. Data collection unit 100 receives the transmitted usage data via communication channels 30a, 30b, and communicates usage data relating to all devices in washroom 10 with which it is adapted to communicate over a second communication channel 20 to server 200.

Server 200 stores and processes the usage data to inform the management of the washroom. For example, server 200 may process the data to provide statistical information as to when periods of heavy usage may occur, to provide predictions as to when the next maintenance visit to washroom 10 should be performed, and to provide warnings to management staff or workers that a particular resource is at or close to depletion or capacity.

The information derived by server 200 from the usage data obtained from washroom 10 via data collection device 100 and communication link 20 may be accessed from an administrator workstation 310 connected to server 200 by a network, for example when a manager is planning the schedule of maintenance visits. Alternatively, the server 200 may, on the basis of the analysis performed of the usage data obtained about washroom 10, provide instructions or revised scheduling information to a hand-held unit 320 provided to a maintenance worker or in association with a particular maintenance cart to direct the maintenance worker to those facilities which urgently require servicing.

By means of such a system as shown in FIG. 2, the maintenance worker need not visit a facility which does not require maintenance, and may preferentially visit those facilities which are particularly in need of maintenance. Thus, such a system may efficiently make use of maintenance resources such as workers, consumables and carts, while reducing the possibility for facilities to degrade into an undesirable state.

Since data collection device 100 is located in or near washroom 10, data links 30a and 30b may be low-power and/or short-range data links, such as i.e. IEEE802.15.4, Zigbee, RF4CE, SP100, IEEE802.11, Bluetooth, or similar technologies. In contrast, since server 100 may be located remotely to washroom 10, and may even be in another geographical location, data link 20 may be implemented as a high-power and/or long-range data link including LAN and WAN components, each of which may be wireless, and which for example may be provided at least in part over an internet and/or over a cellular data link such as a 3G or 4G data link.

To enable communication over data links 30a, 30b with data collection device 100, resource locations 12a and 13a are provided with sensors which are adapted to determine resource usage information for each resource location and to transmit it over the relevant data link. An example of how this may be achieved is shown in FIG. 3, with reference to an embodiment of a bathroom tissue dispenser suitable for use as bathroom tissue dispenser 13a shown in FIGS. 1 and 2.

Figure 3:
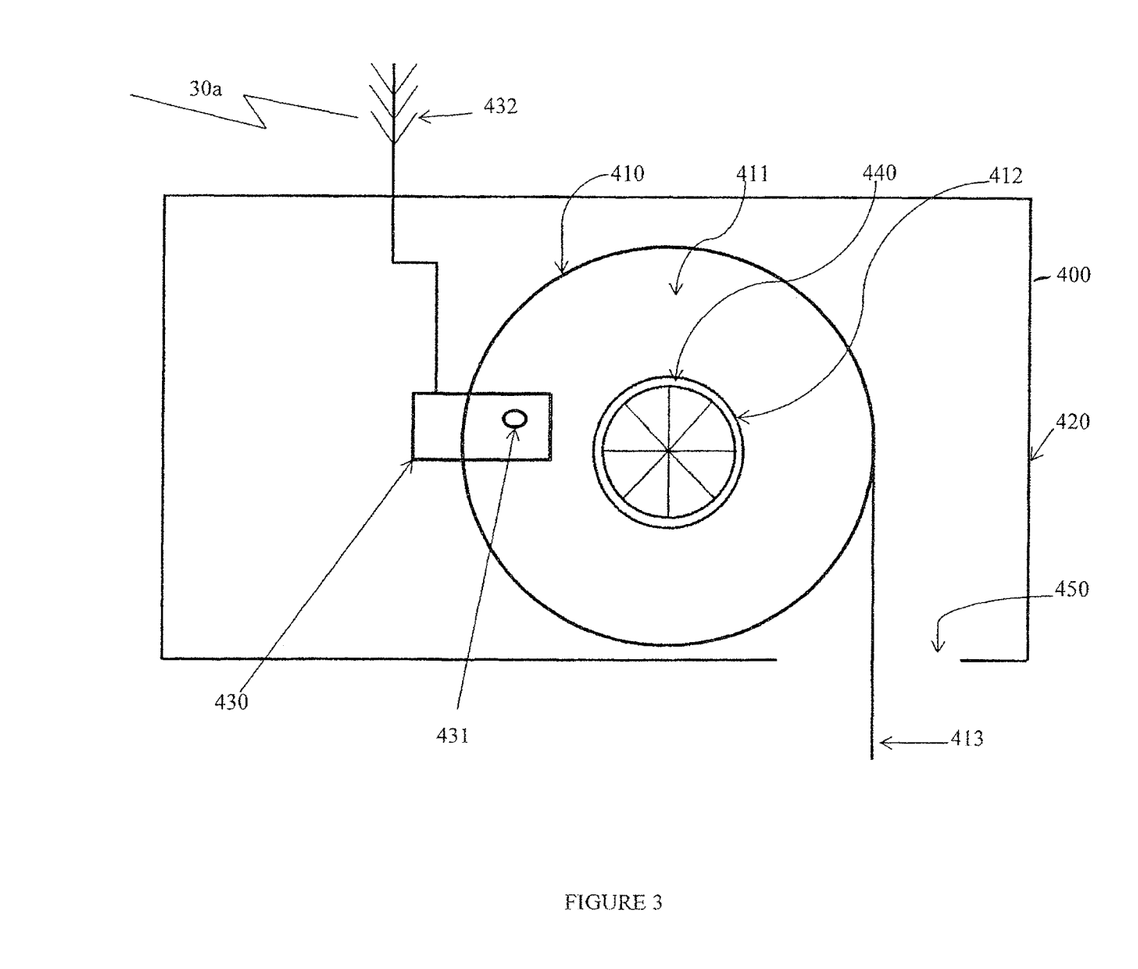
FIG. 3 shows a bathroom tissue dispenser as an example of a resource storage location found in the facility of FIG. 1.

Bathroom tissue dispenser 400 shown in FIG. 3 has a spindle 440 on which a roll 410 of bathroom tissue is mounted. Roll 410 includes a winding of bathroom tissue 411 wrapped around a hollow cardboard core 412, which core is appropriately dimensioned to fit over spindle 440 such that roll 410 may freely rotate on spindle 440. A free end 413 of bathroom tissue extends downward, under gravity, through aperture 450 to enable a user to retrieve and tear an appropriate length of bathroom tissue. Enclosure 420, in which aperture 450 is provided, provides protection for bathroom tissue 411 against the local environment, and especially moisture.

Unlike conventional bathroom tissue dispensers, dispenser 400 is additionally provided with sensor device 430. Sensor device 430 is affixed to an internal wall of enclosure 420 and has a sensing element 431 directed away from the internal wall in an axial direction of spindle 440. Sensing element 431 is adapted to detect the presence or absence of bathroom tissue at a predetermined distance in front of the sensing element. For example, sensing element 431 could be an ultrasonic detector adapted to project ultrasonic waves in an axial direction of the spindle and to detect the intensity of ultrasonic waves reflected by surfaces in front of sensing element 431. Alternatively, sensing element 431 could be an infrared sensor or a visible light sensor, adapted to project and detect infrared or visible radiation in a similar manner. Thus, sensing element 431 acts as a proximity sensor detecting the proximity of an object in front of the sensor in an axial direction of the spindle.

Sensor device 430, and particularly sensing element 431, is so positioned inside enclosure 420 such that when a full reel of bathroom tissue is placed on spindle 440, a portion of wound bathroom tissue 411 is positioned in front of sensor element 431 in an axial direction of spindle 440, and thus causes sensing element 431 to register the proximity of an object. As the bathroom tissue becomes depleted, the diameter of the wound bathroom tissue 411 decreases, until a state is reached that no wound bathroom tissue is positioned in front of sensing element 431 in an axial direction. In such a situation, sensing element 431 will register no obstacle. By appropriately positioning sensor device 430, and particularly sensing element 431, the quantity of bathroom tissue remaining on the roll at the point at which sensing element 431 transitions from an obscured to an unobscured state may be selected. Thus, the state of sensor device 431 may be used to determine whether or not roll 410 of bathroom tissue is close to exhaustion and should be replaced.

In the present embodiments, sensing element 431 provides a signal output, for example a voltage output, representing the intensity of reflected radiation from the wound roll 410. For simplicity, sensor device 430 applies little processing to the output of sensing element 431 and transmits, by means of antenna 432, a value derived from sensing element 431 over communications channel 30a to data collection device 100.

Since data collection device 100, as shown in FIG. 1, may be associated with several different resource locations within a single facility, and thus may be associated with a large number of discrete sensor devices, and also since, for maximum flexibility, every possible resource within the facility which requires management should be provided with a sensor device, the sensor devices, such as sensor device 430, should be made as simple and inexpensive as possible. Furthermore, since certain resource locations may be provided in areas where mains power is prohibited under certain regulations, such as near water closets or hand-washing basins, sensor devices should be able to be powered for a long time on an internal power source such as a battery without requiring external power. Therefore, sensor device 430 is configured to transmit, at a relatively frequent predetermined interval such as between 2 seconds and 16 minutes, a value derived from the output of sensing element 431 over communications channel 30a to data collection device 100. Since data collection device 100 is relatively near each sensor, such as sensor 430, such data transmission need not require high power levels.

The principles of sensing shown in FIG. 3 may also be applied to the management of other resource locations. For example, hand towel dispensers may be provided with level sensor units adapted to detect when the level of hand towels remaining in the dispenser is below a predetermined level, handwash dispensers may be provided with sensor units adapted to determine the level of handwash remaining in the dispenser, and waste bins may be provided with sensor units adapted to detect when the amount of waste in the bin exceeds a predetermined level. Such sensor units are straightforward to implement for one skilled in the art on the basis of the foregoing disclosure using essentially similar principles to that explained in relation to FIG. 3.

In contrast to communications channels 30a, 30b, communications channel 20 connecting data collection device 100 to server 200 is long-range and may require either high power to operate or may require data transmission costs or per-session costs to be incurred, especially in the case in which communications channel 20 includes a segment of a cellular network. Furthermore, although data collection unit 100 is provided associated with a single facility such as washroom 10, and therefore may be associated with a comparatively small number of local resource locations and associated sensors, server 200 may be connected to a large number of data collection devices 100, whether all at one location in the case of a server associated with a particular geographical location, at a small number of geographically dispersed locations in the case where the server handles data relating to a small number of different locations managed by a single organisation or group, or at a very large number of geographically diverse locations in the case of a facilities management contractor which manages multiple sites for multiple clients, even globally. Server 200 may thus in principle need to receive resource usage information from a very large number of resource locations, each of which has a sensor device configured to transmit usage data at a relatively frequent rate.

Therefore, in order to reduce the load on server 200 and to minimise the power consumption and costs associated with the relatively expensive data link 20, data collection unit 100 applies a criterion to the data it receives from each sensor device over the relatively inexpensive local data links to identify usage data which is associated with a particular usage event, such as a depletion or a near-depletion of a resource. Only once data is identified as being associated with a particular usage event is data relating to that usage event transmitted to the server.

The process by which data collection device 100 receives data from sensor devices and communicates data to server 200 will be explained with reference to FIG. 4.

Figure 4:
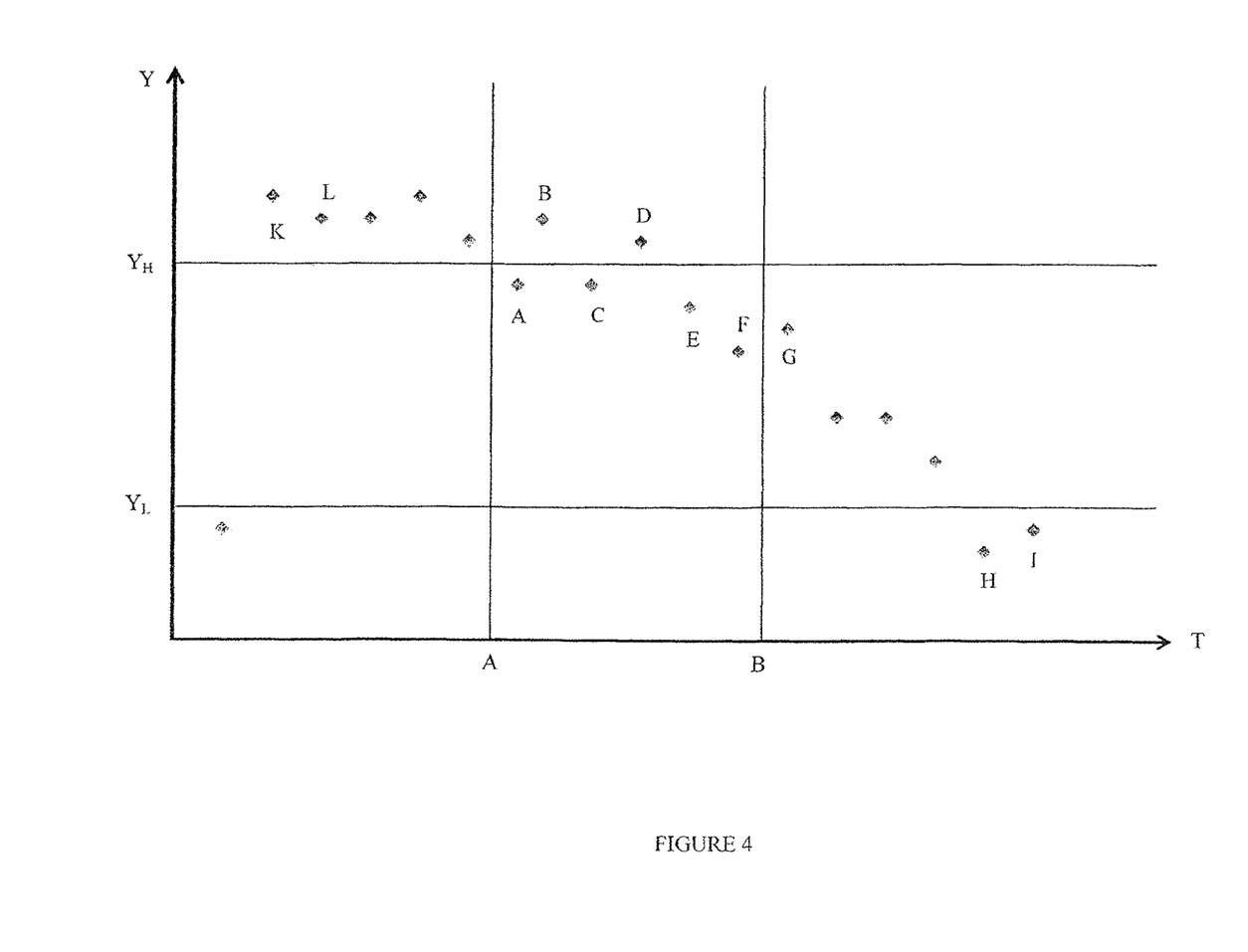
FIG. 4 shows a graph depicting received sensor data from the bathroom tissue dispenser shown in FIG. 3.

FIG. 4 shows a graph of data values received by data collection unit 100 from a sensor device such as sensor device 430. Sensor device 430 is configured to transmit, at a predetermined time interval, the reflected intensity value obtained from sensing element 431 over communications channel 30a. The value of the intensity data received by data collection device 100 is plotted on the Y-axis in FIG. 4. Each data point along the T-axis represents a single transmission from sensor device 430 as time progresses. The data shown in FIG. 4 relates to a period of time in which roll 410 approaches depletion.

At the beginning of the time period in FIG. 4, the roll is absent, and the sensing element registers a low value. For the purposed of explanation, a roll with only a small amount of paper in excess of the value required to trigger replacement is placed on the spindle, and reflected intensity measured by sensing element 431 becomes relatively high, at point k. However, as the diameter of the roll decreases with consumption of the bathroom tissue, the reflected intensity begins to decrease over time, as the circumference of the roll beings to pass across the sensing element.

In one implementation, data collection device 100 applies a threshold to the data received from sensor 430 as a criterion to identify whether the data satisfies the criterion and thus may be associated with an associated usage event. One threshold is shown in FIG. 4 as value $Y_H$, and data collection device 100 is adapted to transmit the value of the sensor only when the value falls below the predetermined threshold. For example, after time A shown in FIG. 4, the reflected intensity falls below threshold $Y_H$ and the criterion is satisfied. Data collection device 100 is thus able to identify the value satisfying the criterion as being associated with a depletion event. Data collection device 100 may thus transmit the value obtained over data link 20 to server 200. Under such a condition, the data is only transmitted to the server when it is associated with the particular usage event, in the present example a depletion event.

In addition, data collection unit 100 may apply further criteria to further reduce the data that needs to be transmitted over communications channel 20 to server 200. For example, once it has been identified that the resource is approaching depletion, and that threshold $Y_H$ has been crossed, it may not be necessary to provide further data to server 200 over communications channel 20 while the roll remains in a depleted state.

Therefore, rather than reporting whenever data that lies below threshold $Y_H$ is identified, data collection unit 100 may be configured to transmit only data representing a change in state of the resource, for example only to transmit data representing a change from a state in which sufficient quantity of a resource remains to a state in which the resource is approaching depletion.

Such a criterion may be implemented by recording, in data collection unit 100, for a particular sensor 430, whether an immediately preceding data point was also below threshold $Y_H$, or whether the immediately preceding data point was above threshold $Y_H$. If the immediately preceding data point was above threshold $Y_H$, and the next data point is below threshold $Y_H$, then a depletion event may be assumed to have occurred. However, if the previous data point was below threshold $Y_H$ and a subsequent data point is also below threshold $Y_H$, then the subsequent data point may be considered to be part of an ongoing depletion event and no further transmission of data relating to the ongoing depletion state need be transmitted to the server.

Such a criterion can also be implemented by setting a state flag associated with the sensor in the detection device to recognise that the threshold has been crossed, and that a depletion event is ongoing, and thus that further data points below the threshold may be ignored for the purposes of communicating with server 200 over communications channel 20.

In some circumstances, fluctuations in the value obtained from sensing device 431 can result in the transmission of yet further unnecessary data. For example, with reference to FIG. 3, if roll 410 of bathroom tissue is not perfectly circular, as roll 410 rotates, when the circumference of the roll overlaps sensing device 431, the sensing device may become partially covered and uncovered. This can lead to a fluctuation of the transmitted data with time, as shown in FIG. 4, with reference to points A, B, C, D and E. For example, in FIG. 4, in the period between time A and time B, data values A; B, C, D and E fluctuate about threshold $Y_H$. Such a circumstance may also arise with, for example, the dispensing of hand towels, as the stack of hand towels can rise and fall during each dispense, or with the dispensing of handwash, as the level of handwash in a container can rise and fall during each dispense.

In such a circumstance, using only a threshold criterion, data collection device 100 might register several transitions from a not-depleted to a depleted state, for example the transition from data point B to data point C and the transition from data point D to data point E, which would result in unnecessary transmission of data to the server 200 over data link 20. Therefore, an additional criterion may be implemented to further reduce the transmission of data over data link 20 from data collection device 100 to server 200.

Specifically, a criterion may be set such that, of a predetermined quantity of data, such as a predetermined number of sequential values transmitted by sensor 430 over data link 30*a*, a certain proportion should be below threshold $Y_H$ for an event to be detected. For example, data collection device 100 may be configured to require two sequential data points below threshold $Y_H$ before it identifies threshold $Y_H$ as having been crossed and a depletion event to have occurred. Therefore, during the time interval between time A and time B shown in FIG. 4, data points A, B, C, D and E will not result in a depletion event being indicated to the server 200 over data link 20, but data point F, below threshold $Y_H$ and being immediately preceded by data point E also being below threshold $Y_H$, will result in such an event being notified. However, as a result of the detection of the transition, rather than the state, mentioned earlier, data points after time B which are below threshold $Y_H$ do not result in further data being transmitted to the server, since data point F is acknowledged as being a previous data point which is already below the threshold, and a depletion event may be acknowledged to be ongoing.

On the basis of the above discussion, it may also be understood that other events than a depletion event can be notified to the server on the basis of the usage data received from sensor 430. For example, on the basis of the preceding discussion, applying similar criteria, once two sequential data points are identified by data collection unit 100 as lying above threshold $Y_H$, it may be determined that a refill has occurred, and therefore data indicative of a refill event may be notified to the server.

If the fluctuations in the data are relatively large, rather than a single threshold being associated with a depletion event when crossed in a first direction and with a refill event when crossed in a second direction, two thresholds may be provided, also as shown in FIG. 4. In such a situation, threshold $Y_L$ is associated with a depletion event, while threshold $Y_H$ is associated with a refill event. In such a configuration, using the above-described criterion, only data point I, being the second of two data points below threshold $Y_L$, will cause a depletion event, being a transition to the depleted state, to be detected and notified to the server 200 over communications channel 20, while data point L, being the second of two data points having values above threshold $Y_H$, results in a refill event, being a transition to a refilled state, to be detected and notified to the server 200 over communications channel 20.

The various techniques described above may be used individually or in combination to reduce the amount of data transmitted to the server, with the understanding that while a reduction of data to the absolute minimum may be desirable for minimising cost of transmission and load on server 200, in some circumstances it may be desired to report more data than the minimum for diagnostic, analytic or predictive purposes. Therefore, depending on the circumstances, only some or all of the above criteria may be applied, including the application of more thresholds to the data, a requirement for a proportion, or in some embodiments, all of a predetermined quantity of data to satisfy a criterion before an event is notified, and a requirement that the data represent a transition event from one state to another rather than an ongoing event before data is notified to the server.

In addition to mentioned criteria, a filtering algorithm may be applied to the usage data before one or more of the above-mentioned criteria for identification of the data as being associated with a usage event is applied. For example, the selected criterion can be applied, rather than to the raw usage data itself, to transformed usage data comprising a series of values of a statistical parameter of a predetermined quantity of the raw usage data, such as an arithmetic mean of a predetermined quantity of data, a geometric mean of a predetermined quantity of data, a mode of a predetermined quantity of data, or a median of a predetermined quantity of data.

To implement such a filtering algorithm, the usage data can be divided into blocks of raw usage data, for example, of a predetermined number of data values or representing a predetermined amount of time over which usage data is collected, for each of which a statistical parameter is be calculated. The series of values of the calculated parameter associated with successive blocks of the raw usage data then becomes the usage data to which the criterion is applied.

Alternatively, a windowing method can be applied wherein for each received raw data point, a statistical parameter of a predetermined preceding window quantity of data points is calculated. The window can represent, for example, a predetermined number of data values or a predetermined amount of time over which usage data is collected. The series of values of the calculated parameter associated with successive points of the raw usage data then becomes the usage data to which the criterion is then applied. When a mean of the data is calculated as the statistical parameter, this method is conventionally termed determination of a moving average.

The former method results in a reduction of the quantity of data on to which the criterion is applied by a factor related to the size of the block, which may be computationally efficient, while the latter results in no reduction of the quantity of data to which the criterion is applied but may be more responsive and which provides, in effect, a statistically smoothed set of usage data.

Alternatively to the calculation of a statistical parameter, a low-pass filtering algorithm may be applied to the data.

Further alternatively, a delta filter algorithm may be applied to the data, wherein, on the basis of a series of raw usage data points, a value of the filtered data is increased by a predetermined step value from the previous value in the series of filtered data when the corresponding raw usage data point exceeds the preceding filtered value in the series of filtered data, and the filtered value is decreased by a predetermined step value from the previous value in the series of filtered data when the corresponding raw usage data point does not exceed the preceding filtered value in the series of filtered data. In some implementations, the step size can vary depending on the difference between the preceding filtered value and the measured value.

The quantity and nature of the data transmitted over communications channel 20 to server 200 may vary in different implementations. In some implementations, some or all of the data transmitted from sensor 430 to data collection unit 100 and associated with a decisive data point, i.e., the data point that satisfied the criterion, may be forwarded to server 200 over data link 20 as notification that a usage event has occurred. The server may then determine, based on for example a transmitted value associated with the decisive data point, the nature of the usage event and may update the state of the location. Alternatively, a logical value, message or flag may be transmitted to server 200 over communication channel 20 either with or without accompanying sensor data to provide an indication of the type of usage event which data collection unit 100 has associated with the data. Alternatively or additionally, where filtering of the data is performed before a criterion is applied, the filtered value of the data may be transmitted to the server. In some circumstances, one or more data values, filtered, unfiltered, or both, for a predetermined period immediately preceding the event, or data values for a period immediately succeeding the determination of the event, may also be transmitted, depending on requirements. Such may be useful for diagnostic, analytic, or predictive purposes.

When the server is notified or has determined the state of the location, the server may then notify, for example via communication with a hand-held terminal, a user of the determined state of the location. The user may then proceed to replenish the location. The server may also predict, on the basis of the determined state of the location, as to when a next maintenance visit to facility should be performed. For example, once the location has indicated a dispenser empty state, the server may schedule a maintenance visit to be performed within a predetermined period of time, such as within a next shift, within a next day, within a next hour, or within fifteen minutes. This can contribute to the maintenance of pleasant and hygienic facilities in an efficient manner.

The above disclosure relates to an implementation in which a sensor is provided in a bathroom tissue dispenser. However, the concepts disclosed therein are analogously applicable to other storage location in a washroom, such as paper towel dispensers and handwash dispensers, which also may be associated with depletion and refill events, and also to locations which require emptying, rather than refilling, such as waste bins, which may be associated with an overfull and emptied events.

Furthermore, the methods, systems, techniques and devices herein described are equally applicable to other locations where consumables may be stored or discarded, without limitation.

Figure 5:
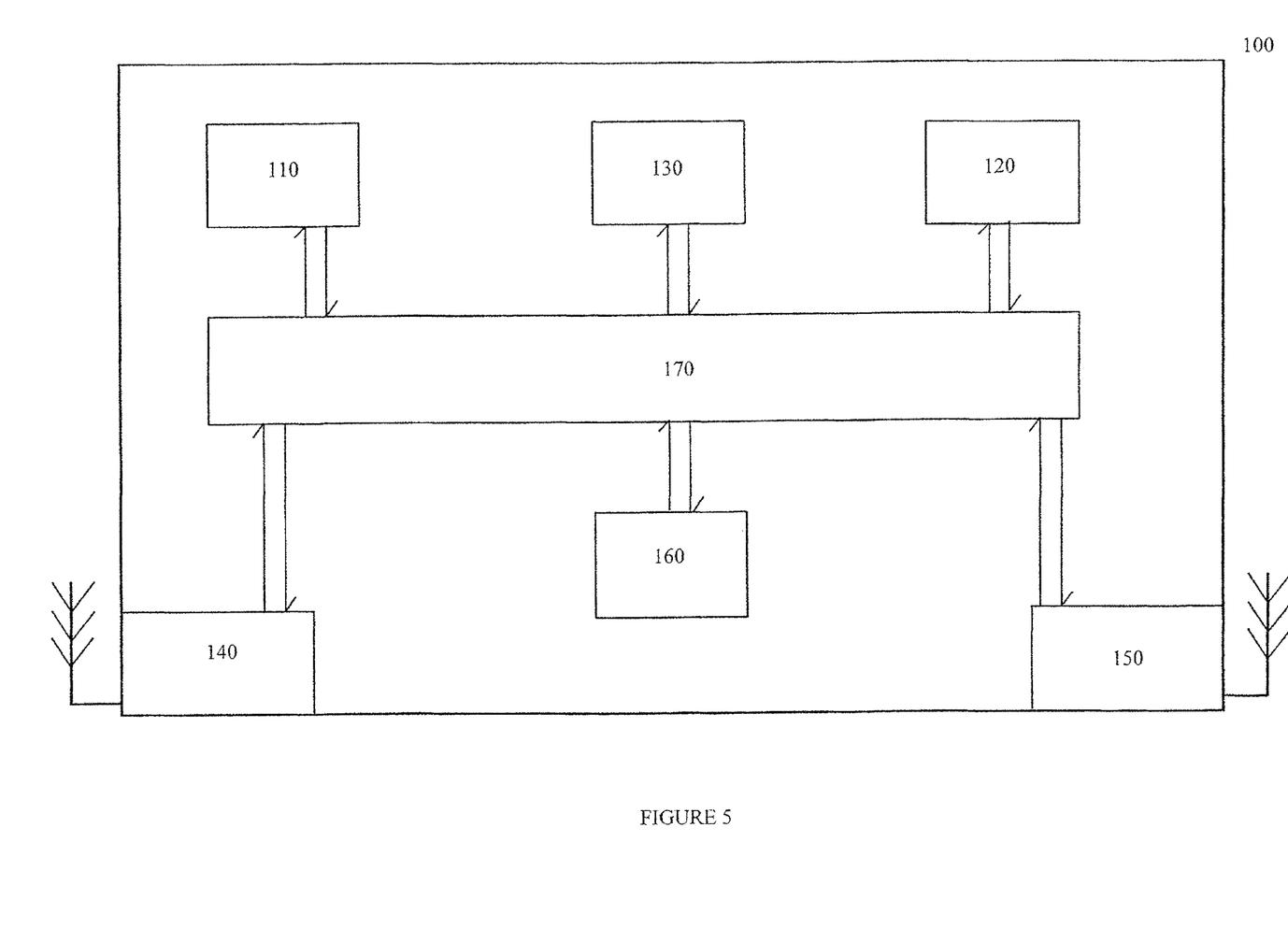
FIG. 5 shows a block diagram of a data collection device usable in the facility shown in FIG. 1.

Data collection device 100 may be implemented by, for example, data processing equipment as exemplified in FIG. 5. In the embodiment of FIG. 5, data collection device 100 has a processor 130 which operates according to instructions stored in instruction store 110. The processor may read and write data to data store 120. Communications between processor 130, instruction store 110 and data store 120 are mediated via bus 170, which is managed by bus controller 160. Also provided to data collection device 100 are communication channel controllers, e.g. radios 140 and 150, which also communicate via bus 170 with the other components of the device, including with processor 130. In particular, radio 140 communicates over communication channel 30a, 30b with the sensors in washroom 10, while radio 150 communicates via communication channel 20 with server 200. Processor 130 may receive sensor data from radio 140, apply filtering and criteria as described above on the basis of program instructions in instruction store 110, using data store 120 as working memory, and may then notify events to server 200 via radio 150. Radio 140 may, for example, be an IEEE802.15.4 radio, while radio 150 may, for example, be a 3G cellular radio. Conventionally, each radio is provided with an associated antenna for accepting and emitting signals in an appropriate frequency band.

Processor 130 may be implemented as at least two processors, one controlling radio 140 and one controlling radio 150, and each having its own data and instruction store. The two processors may then share an interprocessor communications link to enable interoperation and coordination between the processors. The interprocessor communications link may be additional to or using bus 170, and a third supervisor processor may be provided to arbitrate between and control both mentioned processors, and optionally to intermediate between the mentioned processors and other elements of the data collection device, for example via bus 170. Data collection device 100 may be internally powered for example by an internal power source such as a battery or fuel cell or may be externally powered, e.g. via a mains or low voltage DC electrical supply.

Figure 6:
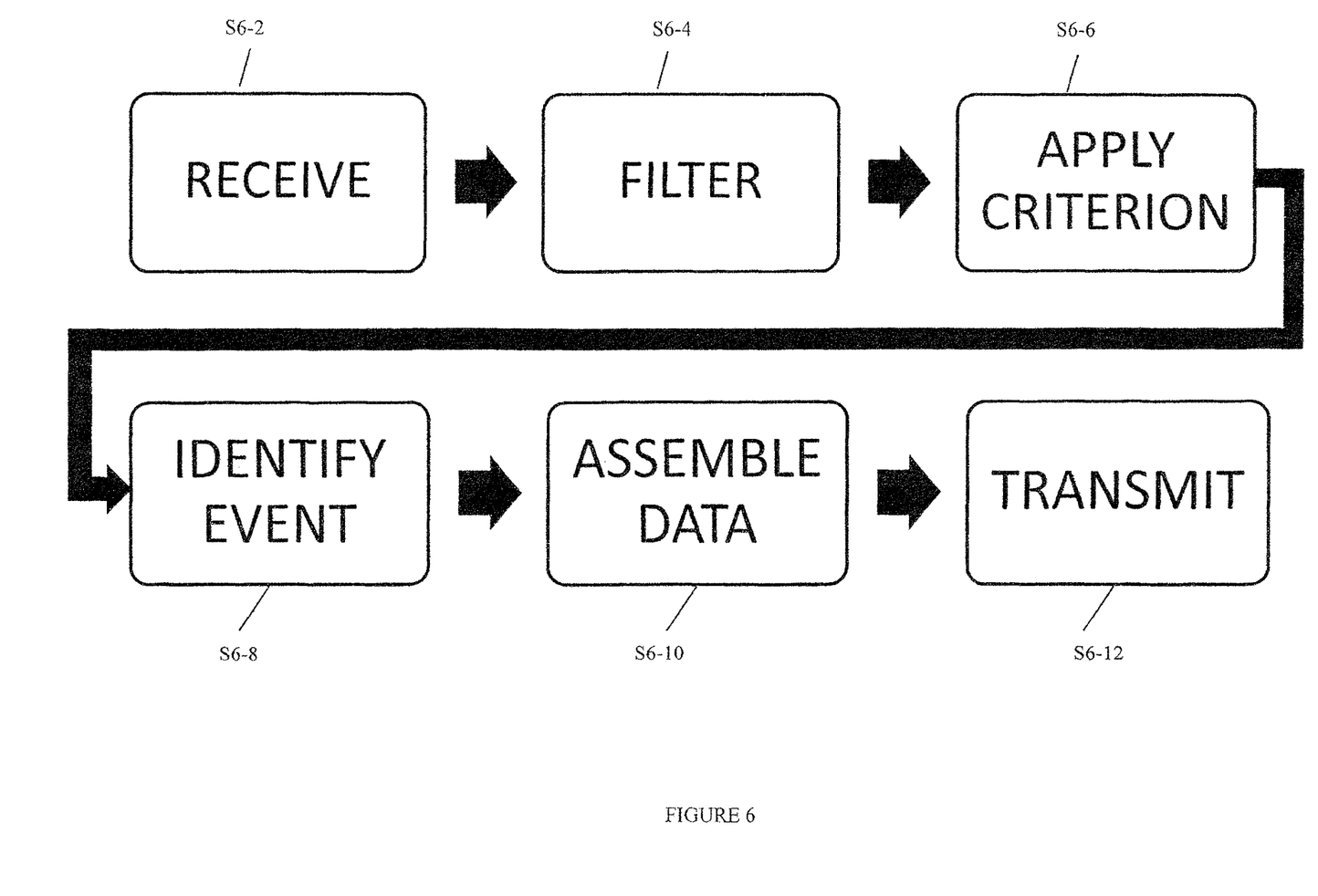
FIG. 6 shows a flow diagram exemplifying an implementation of the resource usage information determination method according to the present disclosure.

The program instructions in instruction store 110 may be configured according to the flowchart shown in FIG. 6.

In one implementation, the data collection device may operate as follows. First, data collection device 100 listens via radio 140 functioning as a receiver to receive data transmitted from sensor device 430 in step S6-2. Once a predetermined quantity of data is received from sensor 430, data collection device 100 may apply, using a filtering unit, a filter algorithm to the data, for example by means of a moving average, in step S6-4 to obtain filtered data. Then, operating on the filtered data provided in step S6-4, data collection device 100 applies, by means of a thresholding unit, a threshold criterion in step S6-6. If the criterion is satisfied, in step S6-8, the data collection device uses an event identification unit, which may include the filtering unit and thresholding unit, to identify that a particular event has occurred and updates a state of the location associated with sensor device 430, for example whether the location is in a refilled state or in an empty state. The state may be updated in a resource state data store which maintains a persistent record of the state of each resource with which the device is associated. Such identification may take into account a previous determination of the state of the location. Once the event has been identified in step S6-8, a message is assembled for transmission to server 200. The message may include, for example, an identifier of the data collection device 100 and a value of the data received from the sensor, and a logical value associated with the event. Once the message has been assembled in step S6-10, the message is then transmitted to the server 200 over communications channel 20 via radio 150 functioning as a transmitter in step S6-12.

Although the process shown in FIG. 6 is shown as a linear process, the process can be operated in parallel, with data being continuously received and stored into memory by radio 140 while processor 130 operates on data store 120 to filter the data, apply the criteria, identify events, assemble data messages, and then provide instructions to radio 150 to transmit the data to the server. Processor 130 can implement the thresholding, filtering and event identification units in software or firmware, while the units could also be implemented as discrete electronics or separate modular dedicated processors. The resource state data store may be implemented as a table in data store 120, or may be implemented on a separate data store to improve, for example, access time.

The above disclosure has been explained with reference to devices, methods, and systems which operate to monitor resource levels in washrooms. However, one skilled in the art will understand this approach and the concepts presented herein are applicable to a wide range of systems in which resource usage in a facility should be monitored. Particularly, one skilled in the art will recognise the foregoing disclosures as being exemplary, and will understand that modifications, variations, or omissions may be made in light of particular engineering requirements. One skilled in the art will be able to apply the concepts taught in the preceding disclosure in a wide range of situations. Accordingly, the present disclosure should not be limited to solely the specific feature combinations listed above, but also to the range of general technical concepts derivable by one skilled in the art on a consideration of the above in conjunction with his or her own general knowledge of the technical field within which the present disclosure is made.

The invention claimed is:

1. A method of determining resource usage information for a facility, comprising:
    establishing a first wireless communications channel between one or more electronic sensors and a data collection device comprising a processor within a housing, the one or more sensors included in a consumable dispenser, the consumable dispenser including a axial extending along an axial direction and configured to support a consumable resource and dispense the consumable resource in response to rotating the axial due to usage of the consumable dispenser;
    outputting a detection signal having a signal intensity from the one or more sensors toward the consumable resource along the axial direction;
    detecting, using the one or more electronic sensors, the detection signal that is reflected from the consumable resource, the signal intensity of the reflected signal indicating an amount of consumption of the consumable resource;
    generating, by the one or more electronic sensors, resource usage sensor data indicative of the amount of the consumption based on the signal intensity of the reflected detection signal and indicative of a location of the consumable dispenser in the facility;
    wirelessly transmitting an electrical signal indicative of the resource usage sensor data from the one or more electronic sensors over the first wireless communications channel such that the data collection device wirelessly receives the resource usage sensor data;
    applying to the resource usage sensor data, by said processor of the data collection device, a criterion that de fines when a predetermined us age e vent associated with a change in a resource state of the location in the facility has occurred;
    identifying, by said processor of the data collection device, whether the resource usage sensor data associated with the predetermined usage event meets the criterion;
    in response to the resource usage sensor data meeting the criterion, assembling a message including a logical value indicative of a type of usage event and the resource usage sensor data associated with the predetermined usage event;
    only transmitting, by said data collection device, said message including the resource usage sensor data associated with the predetermined usage event via a second communications channel to a server in response to the resource usage sensor data meeting the criterion; and
    in response to the resource usage sensor data not meeting the criterion, the resource usage sensor data associated with the predetermined usage event,
    wherein the criterion is met when the resource usage sensor data represents the change in the resource state of the location, and wherein applying the criterion comprises reading previously stored data relating to the resource state of the location in the facility to determine a previously existing resource state of the location in the facility.

2. The method of claim 1, wherein applying the criterion further comprises applying a threshold associated with the predetermined usage event to the resource usage sensor data.

3. The method of claim 1, wherein said stored data includes a data value or a logical flag.

4. The method of claim 1, wherein applying the criterion further comprises:
applying the criterion to each of a predetermined quantity of resource usage sensor data;
determining a proportion of the predetermined quantity of resource usage sensor data that satisfy the criterion; and
identifying us age data as associated with the predetermined usage event based on the determined proportion.

5. The method of claim 4, wherein the predetermined quantity of resource usage sensor data corresponds to a predetermined number of sequentially-received resource usage sensor data values.

6. The method of claim 1, further comprising a process of, prior to applying the criterion, transforming the resource usage sensor data by applying a filtering algorithm to the resource usage sensor data.

7. The method of claim 6, wherein transforming the resource usage sensor data with the filtering algorithm comprises determining a statistical parameter associated with a predetermined quantity of the resource usage sensor data.

8. The method of claim 6, wherein applying the filtering algorithm to the resource usage sensor data comprises dividing the resource usage sensor data into sequential blocks and calculating a filtered value for each block.

9. The method of claim 6, wherein applying the filtering algorithm to the resource usage sensor data comprises calculating a filtered value corresponding to each data value of the resource usage sensor data based on that data value and data values lying within a predetermined window preceding that data value.

10. A method comprising:
outputting a detection signal having a signal intensity from the one or more sensors toward the consumable resource along the axial direction and reflecting the detection signal from the consumable resource, wherein the signal intensity of the reflected detection signal is indicative of an amount of consumption of the consumable resource usage;
detecting, using the one or more electronic sensors, the reflected detection signal and generating using the one or more electronic sensors resource usage sensor data indicative of the amount of consumption and a location of the consumable dispenser in the facility;
transmitting resource usage sensor data indicative of the amount of consumption from the one or more electronic sensors via a first communications channel to a data collection device;
wirelessly receiving, by said data collection device comprising a processor within a housing, an electrical signal indicative of the resource usage sensor data relating to a location in a facility via said first communications channel from said one or more electronic sensors;
applying to the resource usage sensor data, by said processor of the data collection device, a criterion that defines when a predetermined usage event associated with a change in a resource state of the location in the facility has occurred;
identifying, by said processor of the data collection device, usage data associated with the predetermined usage event when the resource usage sensor data meets the criterion;
assembling a message including a logical value indicative of a type of usage event and the resource usage sensor data associated with the predetermined usage event in response to the resource usage sensor data meeting the criterion;
only determining, by said data collection device, to transmit said message via a second communications channel to a server in response to the resource usage sensor data meeting the criterion;
determining, by said data collection device, to store data indicating the occurrence of the predetermined usage event in response to the resource usage sensor data not meeting the criterion in said data collection device; and
transmitting data or storing data, by said data collection device, based on the determinations,
wherein the resource usage sensor data is fill level data associated with the dispenser or the waste bin,
wherein the predetermined usage event is selected from at least one of a low fill level event, a high fill level event, an emptying event, and a refill event, and
wherein applying the criterion comprises reading previously stored data relating to the resource state of the location in the facility to determine a previously existing resource state of the location in the facility.

11. A system comprising:
at least one dispenser configured to provide a consumable resource or a waste bin configured to receive a consumable resource;
one or more sensors coupled to the dispenser or the waste bin, the one or more sensors configured to output a detection signal having a signal intensity toward the consumable resource, to detect a reflection of the detection signal that is reflected from the consumable resource, and to output an electronic signal indicative of resource usage sensor data indicating the signal intensity which changes in response to consumption of the consumable resource and a location in a facility via a first communications channel from the one or more sensors;
a data collection device in signal communication with one or more electronic sensors via a first communications channel, the data collection device configured to:
wirelessly receive the electronic signal indicative of resource usage sensor data indicating the signal intensity of the reflected detection signal and the location in a facility via a first communications channel from one or more sensors;
apply to the resource usage sensor data a criterion that defines when a predetermined usage event associated with a change in a resource state of the location in the facility has occurred;
identify usage data based on the signal intensity of the reflected detection signal as indicated by the electronic signal, the usage data associated with the predetermined usage event when the resource usage sensor data meets the criterion;
assemble a message including a logical value indicative of a type of usage event and data indicating an occurrence of the predetermined usage event in response to the resource usage sensor data meeting the criterion;

only transmit said message including the data indicating the occurrence of the predetermined usage event via a second communications channel to a server in response to the resource usage sensor data meeting the criterion; and store the data indicating the occurrence of the predetermined usage event in response to the resource usage sensor data not meeting the criterion;

wherein the resource usage sensor data is fill level data associated with the at least one dispenser or waste bin, wherein the criterion is applied by reading previously stored data relating to the resource state of the location in the facility to determine a previously existing resource state of the location in the facility, and wherein the predetermined usage event is selected from at least one of a low fill level event, a high fill level event, an emptying event, and a refill event.

12. The method of claim 1, wherein identifying whether the resource usage sensor data meets the criterion further includes identifying the resource usage sensor data associated with the predetermined usage event when the resource usage sensor data meets said criterion for a predetermined number of times to further reduce the data to be transmitted.

* * * * *